April 11, 1933. J. H. WAGENHORST 1,903,566
RIM END CONNECTING DEVICE
Filed Nov. 7, 1929
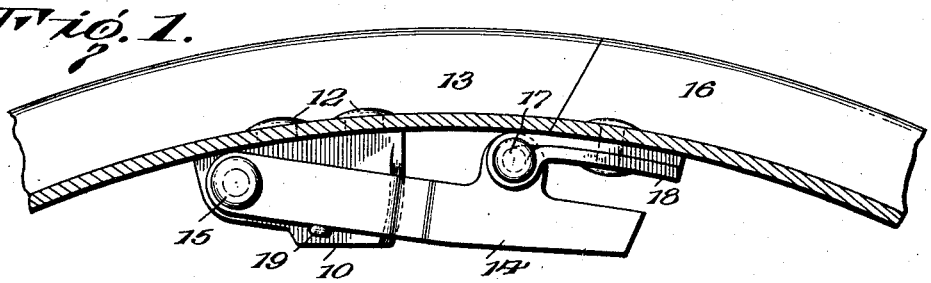
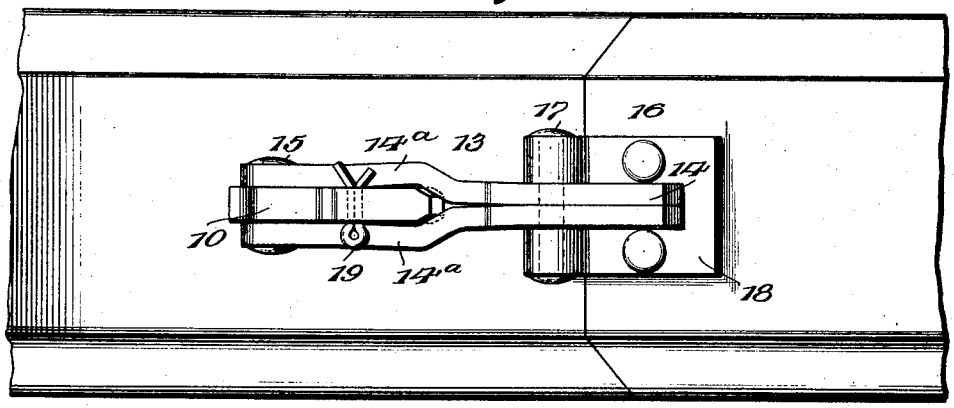
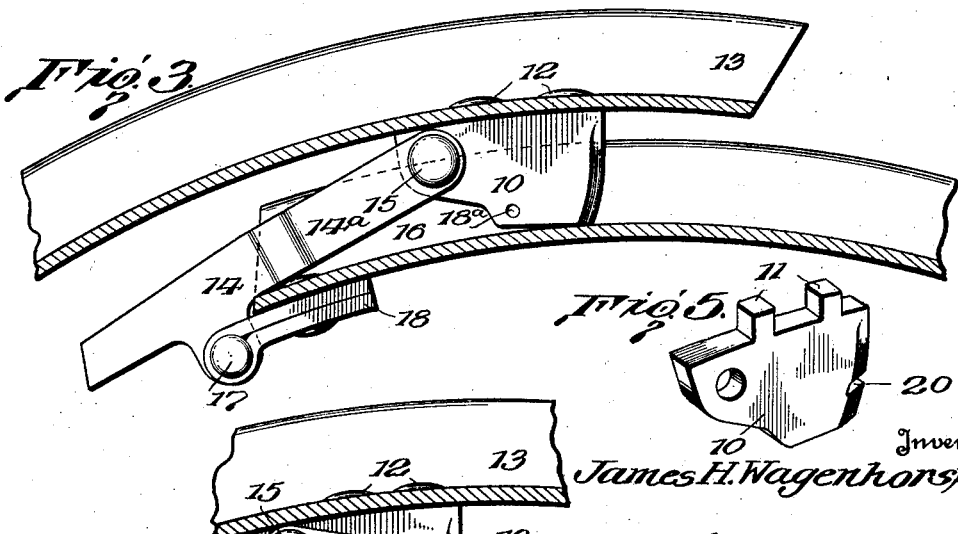
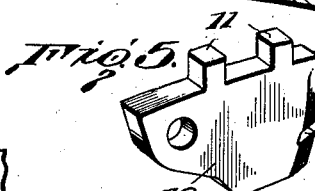
Inventor
James H. Wagenhorst,
By Church & Church
His Attorneys Patented Apr. 11, 1933

1,903,566

UNITED STATES PATENT OFFICE

JAMES H. WAGENHORST, OF DETROIT, MICHIGAN

RIM END CONNECTING DEVICE

Application filed November 7, 1929. Serial No. 405,428.

This invention relates to improvements in demountable wheel rims and particularly to locking means for securing together the ends of transversely split rims.

Automobile manufacturers have eliminated the fabric flap heretofore interposed between the inner tube and rim so that in present day automobile wheels the inner tube is in direct contact with the rim base between the beads of the tire casing. Where the rim is of the transversely split type this elimination of the tube protecting flap necessitates a close fit at the joint formed by the abutting ends of the rim. It also requires the two ends of the rim to be held in lateral alinement with each other. In view of these conditions, the primary object of this invention is to provide a link arrangement for locking together the ends of the rim, the locking device being such that the rim ends are securely held against lateral movement relatively to one another and against radial movement relatively to each other.

In its broader aspect the invention comprises a link pivotally connected to each rim end and a positioning member on one of the rim ends, one of these elements being bifurcated or formed with two laterally spaced surfaces between which the other element is received for preventing relative lateral movement of the rim ends. There may also be removable means for locking said two elements against relative radial movement. More specifically the invention consists of an elongated lug formed with integral riveting portions secured to one rim end and a bifurcated link pivotally attached to said lug and to the other rim end whereby the lug may engage between the bifurcations of the link when the rim ends are brought together, the link being locked against radial movement with respect to the lug by the frictional engagement between those parts or by removable fastening means preferably in the form of a pin held in a recess in the lug and engaging the link. A further object is to simplify the connection by having the lug formed with integral rivets and of sufficient area as to frictionally retain the link in engagement therewith, the lug also having the link pivoted thereto, thereby reducing the number of parts to a minimum.

With these and other objects in view the invention consists in certain details of construction and combinations of parts all as will hereinafter be more fully described and the novel features thereof particularly pointed out in the appended claims.

In the accompanying drawing:

Figure 1 is a side elevational view of the locking device applied to a split rim, the base of which is shown in section and the ends of which are shown locked in their normal position.

Fig. 2 is a plan view of the inner face of the rim showing the locking device applied thereto.

Fig. 3 is a view similar to Figure 1 but illustrating the rim open.

Fig. 4 is a fragmentary sectional view of a rim illustrating a modified locking arrangement, and Fig. 5 is a detailed perspective view of the lug forming a part of the locking device.

As above outlined the invention consists of a positioning element extending radially inward from one rim end and a connecting element in the form of a link pivotally attached to said positioning element and to the other rim end, one of these elements being provided with laterally spaced surfaces between which the other element engages when the rim ends are in abutting engagement with one another. In the preferred embodiment of the invention this locking arrangement consists specifically of a lug 10 formed with integral protuberances 11 constituting rivets which may be riveted over as shown at 12 for the purpose of rigidly attaching the lug to the base of one rim end 13. The connecting element or link 14 is pivotally attached to lug 10 by a rivet 15 extending transversely of said lug and said link is also pivotally secured to the other rim end 16 by a rivet 17 extending transversely through the link and a hinge member 18 riveted to said rim end 16.

To laterally aline the rim ends 13, 16 either the lug 10 or link 14, is formed with laterally spaced surfaces between which the other member is received when the rim ends are in abutting engagement. Preferably, as shown in the drawing, the link 14 is bifurcated so as to form arms 14a that engage the opposite side faces of lug 10. The lug 10 may be said to constitute a friction block in that frictional engagement between its side faces and link 14 is such as to normally prevent rim end 13 moving radially outward with respect to rim end 16. However, in order to positively lock the parts against relative radial movement, my invention contemplates the provision of additional locking means. For instance, as shown in Figures 1 to 3 lug 10 may be formed with a transverse opening 18a in which a cotter pin 19 may be secured, the end portions of the pin engaging the edges of bifurcations 14a of the link. Another form of these locking means is illustrated in Figures 4 and 5 wherein a recess 20 is formed in one end surface of lug 10 and the cotter pin 19 projects through slots 21 in bifurcations 14a of the connecting link with the intermediate portions of said pin lying in said recess 20. The tendency of the parts to move radially relatively to one another will hold pin 19 in this position until manually removed.

By forming the rivets 11 integral with lug 10; by connecting link 14 to rim end 13 through lug 10; and by having said lug function as a friction block to retain link 14 in engagement therewith, the device is of comparatively simple construction and of a minimum number of parts.

What I claim is:

1. The combination of a transversely split wheel rim, a link pivotally connected to both ends of said rim, said link having a slot therein, a lug attached to one rim end having a notch therein, said lug being adapted to engage said link to position the rim ends in lateral alinement, and a pin extending through the slot in said link and shiftable therein into engagement with the notch in said lug to hold the link against movement radially of said lug.

2. The combination of a transversely split rim, one end of which has a tendency to extend slightly beyond the other end radially, a link pivoted to one rim end, said link having a bifurcated portion provided with alined slots intermediate its ends, an elongate fin-like positioning member attached edgewise at one end of the rim base and extending through and snugly received between the bifurcations of the link to retain the rim ends in lateral alinement, said positioning means having a transverse notch alined with said slots when said rim ends are in alinement, and a pin in said slots maintained in said notch by the inherent resistance of the parts to the radial displacement of said link.

3. The combination of a wheel rim transversely split in a plane diagonal to a radius through the split whereby one rim end laps and has a tendency to ride over the other rim end by reason of its inherent tension, a link pivoted to one rim end, a lug member fixed to the other rim end, a pivotal connection between said member and link, said lug member and link being closely associated to maintain lateral alinement of the rim ends, said lug member having a transverse aperture, said link having an abutment constituting edge alineable with said aperture by retracting the lapping rim end against its tendency to ride over the other rim end end, and a pin received in said aperture and abutting the said edge of the link to maintain radial alinement of the rim ends, said pin being retained against displacement by the inherent tension of the rim.

JAMES H. WAGENHORST.